United States Patent [19]

Bilow

[11] 4,108,836

[45] Aug. 22, 1978

[54] PROCESS FOR SYNTHESIZING ACETYLENE-SUBSTITUTED POLYIMIDES AND POLYIMIDES THEREOF

[75] Inventor: Norman Bilow, Encino, Calif.

[73] Assignee: Hughes Aircraft Company, Culver City, Calif.

[21] Appl. No.: 773,887

[22] Filed: Mar. 3, 1977

[51] Int. Cl.² ............................................. C08G 73/12
[52] U.S. Cl. ................................ 528/128; 260/78 UA; 260/78 TF; 260/326N; 428/435; 428/474
[58] Field of Search ............... 260/47 CP, 47 UA, 65, 260/63 R, 78 UA, 78 TF, 326 N, 50

[56] References Cited

U.S. PATENT DOCUMENTS

| 3,845,018 | 10/1974 | Bilow et al. | 260/47 CP |
| 3,879,349 | 4/1975 | Bilow et al. | 260/47 UA |
| 3,897,395 | 7/1975 | D'Alelio | 260/63 N |
| 3,998,786 | 12/1976 | D'Alelio | 260/47 CP |

*Primary Examiner*—Lester L. Lee
*Attorney, Agent, or Firm*—Booker T. Hogan, Jr.; W. H. MacAllister

[57] ABSTRACT

A dianhydride is converted into an alcohol-soluble di-ester and subsequently used to form a lacquer with a mixture of a diamine and an aminoarylacetylene. When the solvent is removed and the mixture of compounds is heated to a curing temperature a cured acetylene-end-capped polyimide polymer is produced.

8 Claims, No Drawings

PROCESS FOR SYNTHESIZING ACETYLENE-SUBSTITUTED POLYIMIDES AND POLYIMIDES THEREOF

BACKGROUND OF THE INVENTION

1. Field of the Invention

This invention is generally related to processes for the preparation of polymide oligomers and thermosetting polyimides and more particularly to a process for preparing alcohol soluble polyimide precursors which can be imidized in situ and cured through acetylene end groups.

2. Prior Art

Acetylene-end-capped polyimides have been shown to be useful in the formation of structural composites and materials requiring high thermal resistance and good physical properties. Laminates, composites, adhesives and lubricants have been prepared from acetylene end-capped polyimides which exhibit exceptional physical strength, heat resistance and other properties which find many aerospace and commercial applications.

The closest prior art to this invention is found in U.S. Pat. Nos. 3,879,349, 3,928,450 and 3,845,018 issued to the Applicant herein and his co-inventors. This art describes the reaction of diamines, such as 1,3-bis(3-aminophenoxy)benzene with dianhydrides such as benzophenonetetracarboxylic dianhydride to provide anhydride-terminated intermediates which subsequently can be reacted with acetylene-substituted amines to yield acetylene-substituted amide acids (also known as amic acids) or imides or mixtures thereof. The extent of imidization is determined by the amount of heating since the amic acids convert to imides above 50° C. Higher temperatures increase the rate of conversion and thus higher temperatures are usually used. In this art highly polar solvents such as dimethylformamide or N-methyl-pyrrolidone are generally required to keep the products in solution while the imidization is proceeding. Solution imidization is employed because of its propensity for yielding a more homogeneous reaction.

The necessity for using high-boiling solvents in the prior art processes led to obvious disadvantages such as difficulties in removing the solvent from the final product and the necessity of utilizing high molding pressures and post curing temperatures. The resulting products were therefore expensive because of increased labor and material costs.

SUMMARY OF THE INVENTION

This invention has as one purpose, the provision of an acetylene-substituted polyimide synthesis process which eliminates the need for using high-boiling solvents during the preparation of composite structural materials.

An additional purpose is to provide a process which yields a polyimide prepolymer that is soluble in methanol, ethanol, acetone or other low-boiling solvent.

A still further purpose is to provide a process which yields prepolymers or precursors thereof which dissolve in non-toxic solvents.

A fourth purpose is to provide acetylene-substituted polyimide oligomers which have such good solubility characteristics that lacquers with 60 to 80% solids content can be made.

A still further purpose is to provide oligomers which can be processed into composites under mild pressures such as autoclave pressures.

In seeking to achieve the above-stated purposes, oligomers have been produced which are soluble in low-boiling non-toxic solvents. They are infinitely soluble in methanol prior to imidization. They can be molded under low pressures such as autoclave pressures and they yield high-strength, low-void content composites.

The invention is practiced by first reacting a dianhydride such as benzophenonetetracarboxylic dianhydride, diphenyl ether tetracarboxylic dianhydride, diphenylsulfide tetracarboxylic dianhydride, diphenylmethane tetracarboxylic dianhydride or diphenyl hexafluoropropane tetracarboxylic dianhydride with a lower aliphatic alcohol to form a di-ester. It should be noted that some mono-esters and tri-esters may be formed during this portion of the reaction. However, the di-ester formation generally predominates during the processes.

The esterification product forms a true solution in solvents such as acetone or lower alkyl alcohols. To this solution a diamine such as 1,3-bis(3-aminophenoxy)benzene is added and the mixture is allowed to stir or heat for a brief period of time to form a second solution. Finally, an aminoarylacetylene such as aminophenylacetylene is added to this second solution to form a mixture of compounds which includes amic acids, amine salts and even some imide groups.

When this mixture of compounds is heated to reflux and part of the alcohol is distilled off a viscous prepolymer lacquer is obtained. This lacquer can be used as a prepolymer varnish for impregnation purposes without further treatment or it can be heated further to increase the degree of polymerization or imidization.

DETAILED DESCRIPTION OF THE INVENTION

Oligomers or monomer mixtures produced by this invention are soluble in low-boiling non-toxic solvents such as ethanol and are moldable under low to moderate pressures (typically experienced with autoclaves) to yield high-strength, low-void content composites. These oligomers differ from prior art acetylene-terminated end-capped polyimides in that high-boiling solvents are not needed.

The first step of the invention is to convert a dianhydride into a di-ester which is soluble in alcohol or other low-boiling solvent. Alcohols, such as methanol, ethanol, propanol and butanol have been found to be suitable. However, ethanol and methanol are generally the preferred solvents. The reaction occurs when the temperature of the alcohol dianhydride mixture is raised to approximately 78° to 80° C. This precise temperature is not critical however. During this reaction some mono-ester, some tri-ester and predominantly di-esters are formed. The di-esters are preferred.

After esterification occurs, a true solution is obtained. To this solution a diamine such 1,3 bis(3-aminophenoxy)benzene or its sulfur analog is added and the mixture is allowed to stir, or heat gently and stir for a brief period of time. This results in the following reaction:

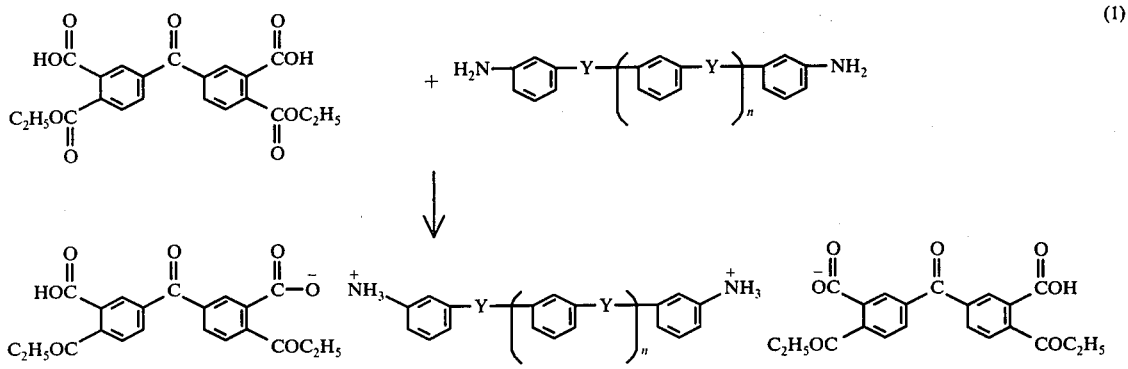

(1)

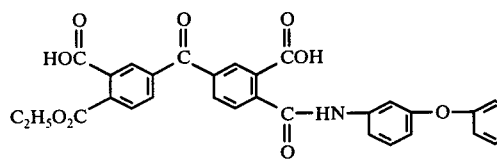  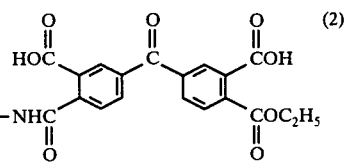

Where n may range from 0 to 10 and is preferably 1 and Y may be O or S or mixtures of O and S.

It should be noted, however, that during the first portion of this reaction some portion of amide linkages may also be produced. Thus, a part of the product can be:

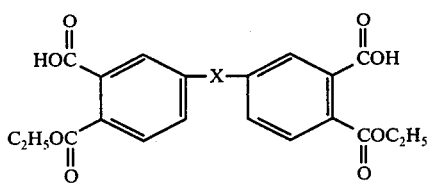

(2)

After the above process is complete, an aminoarylacetylene is added. The product is a solution of various compounds including amic acids, amide acids, amine salts. Some imide groups may also be present. A preferred aminoarylacetylene for use in this particular invention is aminophenylacetylene. However, other aminoarylacetylenes may be used such as aminophenoxyphenylacetylene, aminoethynyldiphenylsulfide, and aminophenylethynylphenylmethane.

The mixture of compounds may be used directly as a laminating resin varnish, or it may be heated to reflux to remove part of the alcohol thereby providing a viscous prepolymer lacquer. This lacquer can be used, as stated above, without further treatment or it can be heated further to promote amide formation or increase the degree of imidization. This is commonly referred to as "B" staging.

The lacquer (prior to "B" staging) can be used to impregnate fabrics such as glass fabrics or graphite fabrics and the coated fabrics subsequently dried in air. The resin can then be imidized in situ on the fabric and after imidization has preceeded sufficiently the material can be molded and cured at 485° F for about 2 hours. It is preferable to give the cured specimens additional postcures at temperatures up to 600° F for several hours. For certain applications a post cure to 700° F is also desirable.

Laminates with less than 1% voids have been prepared in this manner. The laminants were of excellent quality and of high strength. Specific examples of this invention are shown below:

EXAMPLE I

A mixture of benzophenonetetracarboxylic dianhydride (64.4g) and absolute ethanol (150 ml) was heated at reflux (79° C) until complete dissolution was achieved (3 hours and 20 minutes). Heating was stopped and the temperature fell from 84° C to 55° C in the first 20 minutes and to 40° C in another 20 minutes. The esterified product was primarily the end terminated half-ester:

(3)

where X is CO. However, when other dianhydrides are used, X may be $CH_2$, S, O, $CF_2$ or $C_3F_6$.

After cooling to 28° C, 1,3-bis(3-aminophenoxy)benzene (29.2g) was added over a five minute period. The mixture was stirred overnight (most of the amine dissolved in about two hours). In the morning a noticeable increase in viscosity was seen. 3-Aminophenylacetylene (23.4g) was added and the solution was allowed to stir for twenty minutes.

Sixty-five grams of the solution was heated at reflux for about one hour and twenty minutes. No viscosity change was noted. Thus, it was reheated at reflux one and one-half hours (after setting overnight). Ethanol was distilled off until the pot temperature was 95° C. The lacquer was as viscous as molasses. Both materials were then heated to cause imidization to take place after the lacquer had been applied to a glass cloth for impregnation. Molding of the impregnated fabric was subsequently performed. A vacuum bag molding technique is preferred because of the formation of gaseous by-products during the imidization of the resin. The imidization was done at 350° F for forty-five minutes and samples were molded at 485° F (20 hours, 250 psi) giving a 181E glass laminate with 25% resin content and about 1% voids.

A second sample of the lacquer impregnated fabric was heated to promote resin advancement then molded at 485° F for two hours and then post cured (450° F, 500° F, 550° F and 600° F for four hours at each temperature).

EXAMPLE II

A mixture of benzophenonetetracarboxylic dianhydride (64.4g) and ethanol (150 ml) was heated at reflux for one hour and 15 minutes. Complete solution was achieved. This solution was allowed to cool to 55° C and 1,3-bis(3-aminophenoxy)benzene (29.2g) was added, the mixture was stirred for one and one-half hours, then it was heated to 52° C for approximately 19 hours during which time all of the diamine dissolved. 3-Aminophenylacetylene (23.6g) was added and heat was applied to distill off part of the ethanol. When the pot temperature was 102° C and 88 ml of ethanol had been removed the viscous product was transferred to a jar for subsequent use. It was used to impregnate a glass fabric and the impregnated fabric subsequently was heated to promote drying and resin advanvement (a "B" staging).

Multi-layer stacks of the impregnated fabric were then molded under heat and vacuum to provide high strength laminates after cure.

Having fully described my invention and how to make and use it, the scope of my claims may be understood as follows.

What I claim is:

1. A method for preparing an acetylene end-capped polyimide oligomer, or a monomer mixture which is a precursor to such an oligomer, that is soluble in low-boiling non-toxic solvents and suitable for forming lacquers with high solids content comprising the steps of preparing an alcohol soluble ester by reacting two moles of a dianhydride with a lower aliphatic alcohol thereby forming an alcohol solution with said ester, adding one mole of a diamine to said solution while agitating said solution to form a solution of monomeric reactants containing some amic esters or amine salts and causing said esters or salts to react with two moles of an aminoarylacetylene whereby an alcohol soluble oligomer is formed.

2. The method of claim 1 wherein said lower alcohol is selected from the group consisting of methyl alcohol, ethyl alcohol, propyl alcohol and butyl alcohol and said aminoarylacetylene is Aminophenylacetylene.

3. The method of claim 1 wherein said diamine is 1,3-bis(3-aminophenoxy)benzene, said dianhydride is benzophenonetetracarboxylic dianhydride, said alcohol is ethyl alcohol and said aminoarylacetylene is Aminophenylacetylene.

4. An acetylene end-capped polyimide oligomer that is soluble in low-boiling non-toxic solvents and suitable for forming lacquers with high solids content comprising 2 moles of the reaction products of a dianhydride and an alcohol which has been reacted together with one mole of a diamine and subsequently treated with 2 moles of an aminoarylacetylene to form a mixture that is soluble in alcohol.

5. A mixture of compounds that is soluble in a low-boiling non-toxic solvent or mixture of low-boiling solvents and suitable for preparing acetylene-end-capped polyimide oligomers and polymers comprised of an aminoarylacetylene mixed with an alcohol soluble aryldiamine and a di-ester of a dianhydride in a 2:1:2 molar ratio in the presence of a solvent.

6. The mixture of claim 5 wherein said acetylene is aminophenylacetylene, said diamine is 1,3-bis(3-aminophenoxy)-benzene, and said di-ester is an end terminated di-ester of benzophenonetetracarboxylic dianhydride.

7. The mixture of claim 6 wherein said solvent is ethanol.

8. The mixture of claim 6 wherein said solvent is methanol.

* * * * *